United States Patent
Jones (10) Patent No.: US 6,895,923 B1
(45) Date of Patent: May 24, 2005

(54) ROTARY AND CENTRIFUGAL DRIVEN INTERNAL COMBUSTION ENGINE

(76) Inventor: Craig Jones, 169 N. Gratiot Ave., Mt. Clemens, MI (US) 48043

( * ) Notice: Subject to any disclaimer, the term of this patent is extended or adjusted under 35 U.S.C. 154(b) by 0 days.

(21) Appl. No.: 10/759,485

(22) Filed: Jan. 16, 2004

(51) Int. Cl.[7] .............................. F02B 53/00; F01C 1/00
(52) U.S. Cl. ................................................. 123/245
(58) Field of Search ............................... 123/241, 245, 123/44 A, 44 R (56) References Cited

U.S. PATENT DOCUMENTS

| | | | | |
|---|---|---|---|---|
| 1,003,800 A | * | 9/1911 | Rodigin | 123/18 A |
| 4,249,487 A | | 2/1981 | Chambers | 123/44 C |
| 4,279,577 A | * | 7/1981 | Appleton | 418/35 |
| 5,080,050 A | | 1/1992 | Dale | 123/44 B |
| 5,400,754 A | * | 3/1995 | Blanco Palacios et al. | 123/245 |
| 5,419,288 A | | 5/1995 | Dale | 123/44 B |
| 5,524,577 A | | 6/1996 | Clifford | 123/44 D |
| 5,758,609 A | | 6/1998 | Smith | 123/44 R |
| 5,992,371 A | * | 11/1999 | Raso | 123/245 |
| 6,036,461 A | * | 3/2000 | Bahniuk | 123/245 |
| 6,062,175 A | | 5/2000 | Huang | 123/43 R |
| 6,240,884 B1 | | 6/2001 | Lillbacka | 123/44 D |
| 6,305,345 B1 | * | 10/2001 | Bakhtine | 123/245 |
| 2002/0023597 A1 | | 2/2002 | Lillbacka | 123/44 D |

* cited by examiner

*Primary Examiner*—Sheldon J Richter
(74) *Attorney, Agent, or Firm*—Gifford, Krass, Groh, Sprinkle, Anderson & Citkowski, p.c.

(57) ABSTRACT

A rotary engine assembly having a three dimensional and substantially cylindrical shaped outer casing. A plurality of pistons are mounted in circumferentially traversable fashion within the casing, each including a male feature extending from one end and a recess defined within an opposing piston end and within which the male feature seats at selected stages during a rotary combustion cycle associated with the pistons. A valve is operable with each of the pistons and in order to communicate, to the associated piston, at least one air intake port and exhaust port extending through the casings and communicable with the pistons during discrete stages of the combustion cycle. A plurality of ratchet plates are operably engaged to the pistons and traversable therewith, the ratchet plates engaging and actuating in rotary fashion a central crankshaft. An oil feed line is associated with a central location of the engine assembly, the oil being disbursed through centrifugal force throughout the pistons and associated contact surfaces and recollecting in gravity fashion within a lowermost disposed oil pan.

19 Claims, 13 Drawing Sheets

ROTARY AND CENTRIFUGAL DRIVEN INTERNAL COMBUSTION ENGINE

BACKGROUND OF THE INVENTION

1. Field of the Invention

The present invention relates generally to internal combustion engines and, more particularly, to an improved variant of a rotary combustion engine which exhibits improved output and fuel efficiency.

2. Description of the Prior Art

The prior art is fairly well documented with various types of internal combustion engines, including both those of the conventional push/pull and rotary drive variants. The objective in each instance is the desire to maximize power output and fuel efficiency of the engine design.

A first example of the prior art is illustrated in U.S. Pat. No. 6,240,884, issued to Lillbacka, and which teaches a valveless rotating cylinder internal combustion engine. At least one cylinder is rotatable along an inner circumferential surface of an engine housing. A piston rod extends from the piston and is movable longitudinally within the cylinder. The piston rod is in turn connected to a crankshaft such that, when the engine is powered, both the cylinder and crankshaft can rotate in either the same or opposite directions.

An exhaust opening is provided at a location substantially at the top portion of the cylinder and a corresponding exhaust port is provided in the housing such that, when the cylinder is rotated to the particular location along the housing, its exhaust opening comes into alignment with the exhaust port of the housing and so that the exhaust gases resulting from the combustion in the cylinder are evacuated directly outside of the housing. A gear mechanism converts the rotational movement of either the cylinder, crankshaft, or combination thereof, to drive the vehicle or a power generating device to which the engine is adapted.

U.S. Pat. No. 6,062,175, issued to Huang, teaches a rotating cylinder internal combustion engine which includes multiple cylinder blocks in series rotatably mounted in a single casing. The cylinder blocks each define multiple cylinders along a circumferential portion of the cylinder block and in order to receive a piston within each one. The casing forms multiple spark plug holes and defines multiple exhaust ports and multiple intake ports in the periphery thereof. Each of the cylinders is accessible to the spark plugs, the exhaust ports and the intake ports upon rotation of the cylinder block. The spark plugs, the exhaust ports and the intake ports of the various blocks are further staggered.

Finally, U.S. Pat. No. 5,080,050, issued to Dale, teaches a yet further variation of a rotary internal combustion engine having spherical pistons mounted in radially arranged cylinders formed in a stacked series of rotatable cylindrical members. A stationary cam surface is located around the rotatable member to maintain contact with the pistons. A stationary member located with the rotatable cylindrical member provides a fresh fuel mixture, withdraws exhaust products, and provides ignition as required. Power is taken from the rotating cylindrical members at the end of the engine through a planetary gear train.

SUMMARY OF THE PRESENT INVENTION

The present invention discloses a rotary internal combustion engine of improved design and which operates to maximize power output as well as fuel efficiency in operation. The rotary engine design operates on the principle of centrifugally driven forces and in order to maximize efficiency of driving forces associated with the cylinders.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Referring now to FIGS. 1–22 in their entirety, and to individually cited figures individually, an exploded and overall view is illustrated at 10 (see in particular FIG. 1) of the rotary internal combustion engine according to the present invention. As described previously, the present invention provides a rotary and centrifugally driven engine, capable of operating in either a two stroke or four stroke fashion, and which exhibits increased power output with optimized fuel efficiency.

As illustrated with reference again to FIG. 1, as well succeeding reference to FIGS. 2–4 and 7–10, the rotary engine 10 includes a generally circular shaped and three dimensional outer case 12. The case 12 exhibits a plate surface, from which extends a three dimensional and circumferential side and in order to define an open interior. A plurality of circumferentially extending and heat distribution fins 14 are arranged about an outer-most end surface 15.

As will be explained in further detail, fuel injection port holes are located at 16, see in particular FIGS. 2–4, 9 and 10, for providing the ingredients of combustion to the interiorly located piston and valve assemblies. Air cooling slots are further located at 38, see in particular FIGS. 2 and 7, and extend in circumferential fashion about a rear base surface of the case 12. An embossment to house crankshaft bearing 20 is located within a central aperture associated with the base surface of the case 12 and a plurality of cover attachment holes 22 are located at circumferentially spaced intervals about a flange 23 extending in outer-most peripheral fashion about the outer case 12.

Additional features associated with the outer case 12 include the provision of mounting brackets 26 extending from oppositely and circumferentially spaced locations associated with the end surface 15, and which serve to mount the engine assembly 10 to a desired location such as within an engine compartment associated with a vehicle (not shown). The mounting brackets 26 are secured to the motor casing by welding or other means of attachment. Other and additional features associated with the outer case 12 include exhaust manifold attachment studs 28, exhaust holes for pistons 30, oil collection drain slots 32 and oil pan attachment holes 34.

A cover, see generally shown at 36, attaches to the main outer casing 12, such as by bolts 192 which secure over the attachment holes 22. The cover 36 includes a plurality of air cooling slots 38, arranged in circumferential extending fashion about an inner periphery of the cover. An embossment, see in particular FIG. 2, for securing to a house crankshaft bearing is shown at 40 (see also FIG. 11) and a plurality of air intake holes are illustrated at 42 for providing air intake to the various pistons. Although not shown, the crank would extend outwardly where a fan and/or a belt system may be mechanically attached for use with an alternator or other device. Finally, the cover 36 includes such other and additional features as oil intake holes 24 and attachment holes 43 (see FIG. 11) for securing to the associated end face of the outer casing 12.

Figure 1:
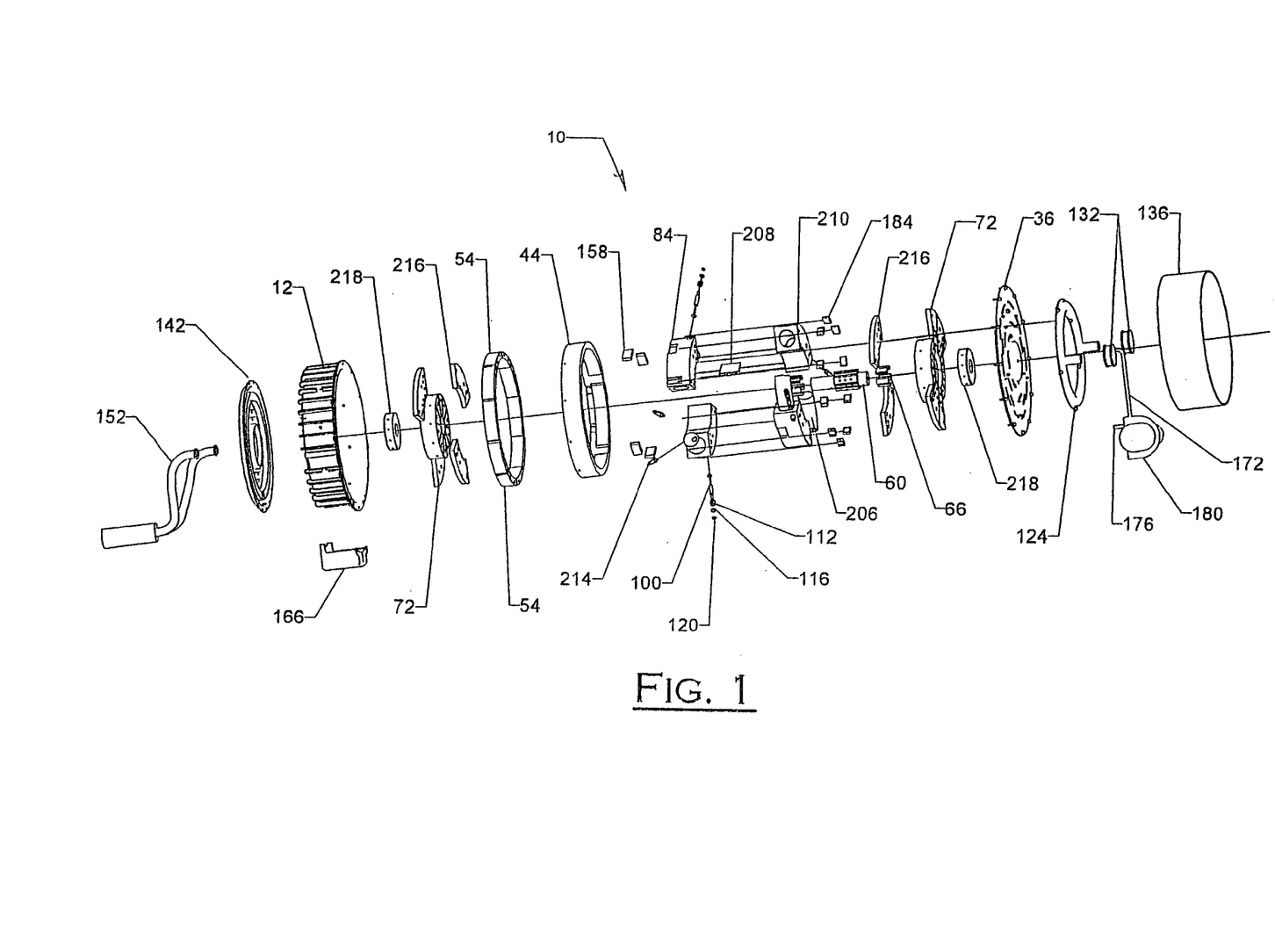
FIG. 1 is an overall exploded view of the rotary internal combustion engine according to the present invention.
Figure 2:
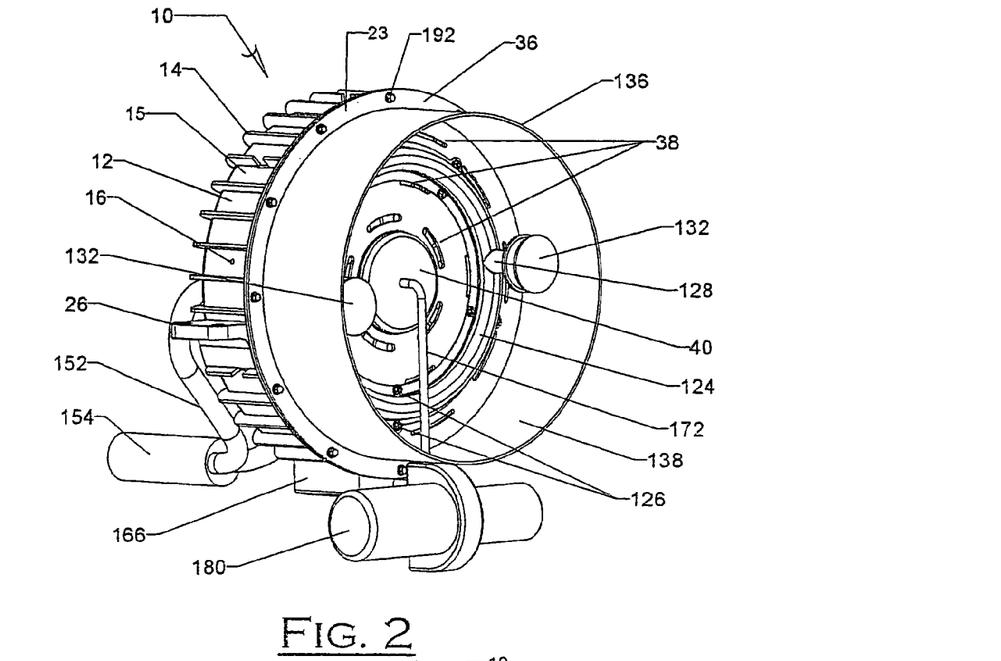
FIG. 2 is a sectional front perspective view of the assembled engine.
Figure 4:
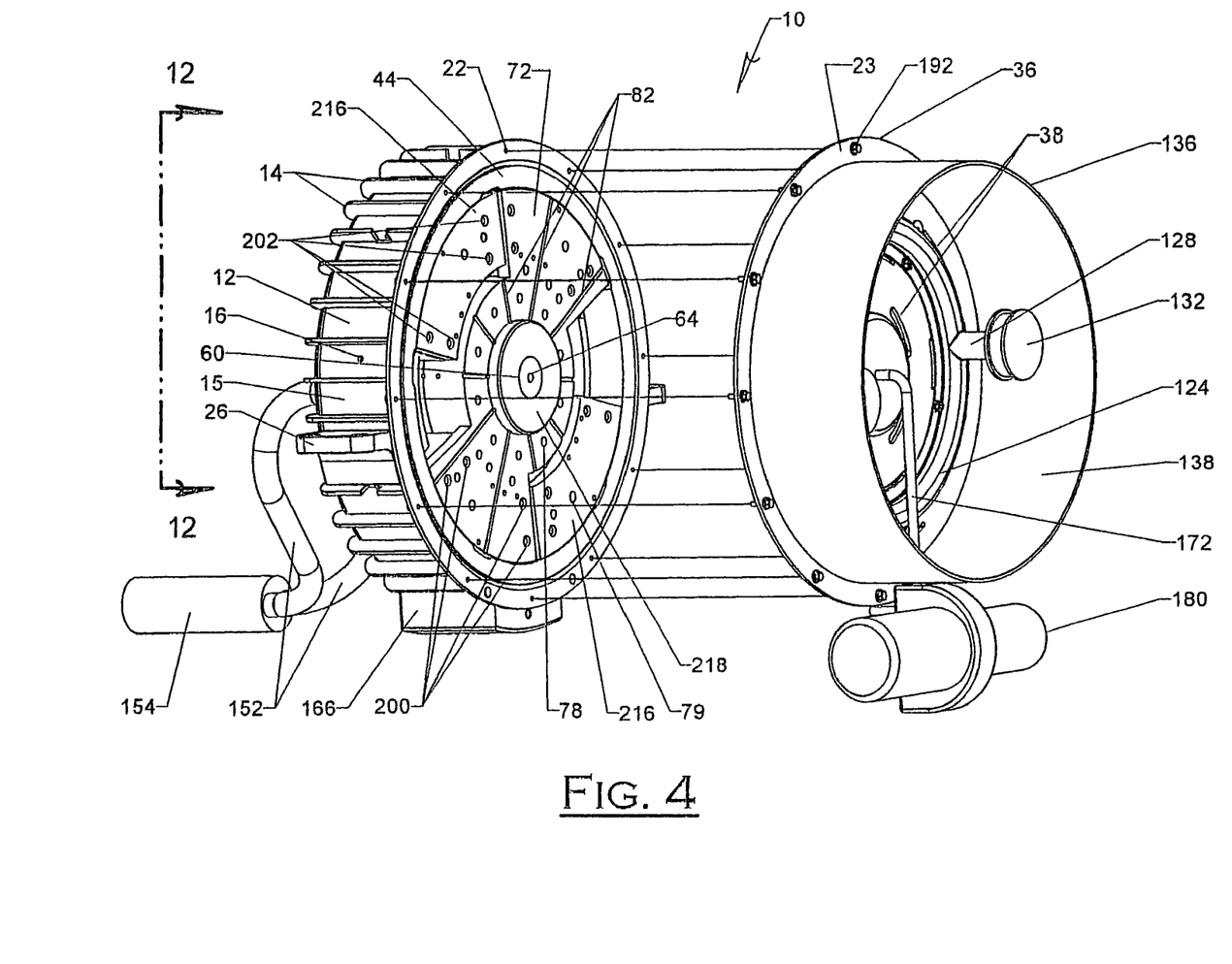
FIG. 4 is an exploded perspective illustrating the cover removed from the engine assembly.
Figure 14:
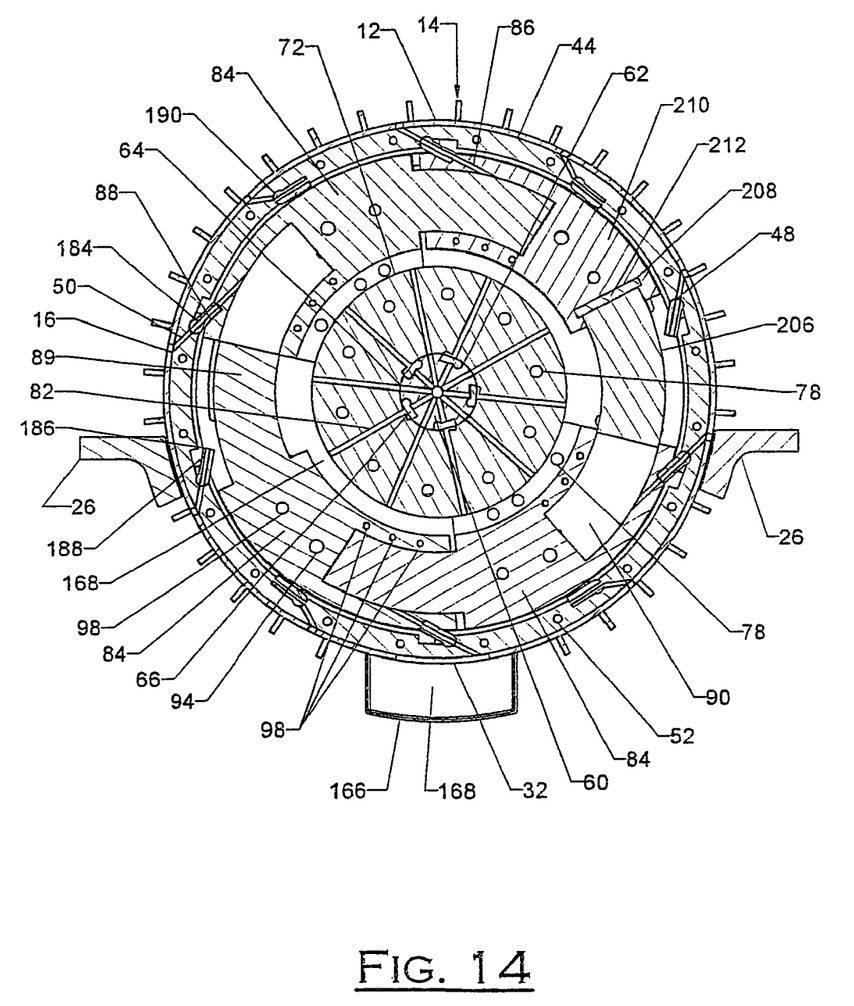
FIG. 14 is a sectional cutaway taken along line 14—14 of FIG. 9 and showing the inner workings of the main sub-assembly.
Figure 15:
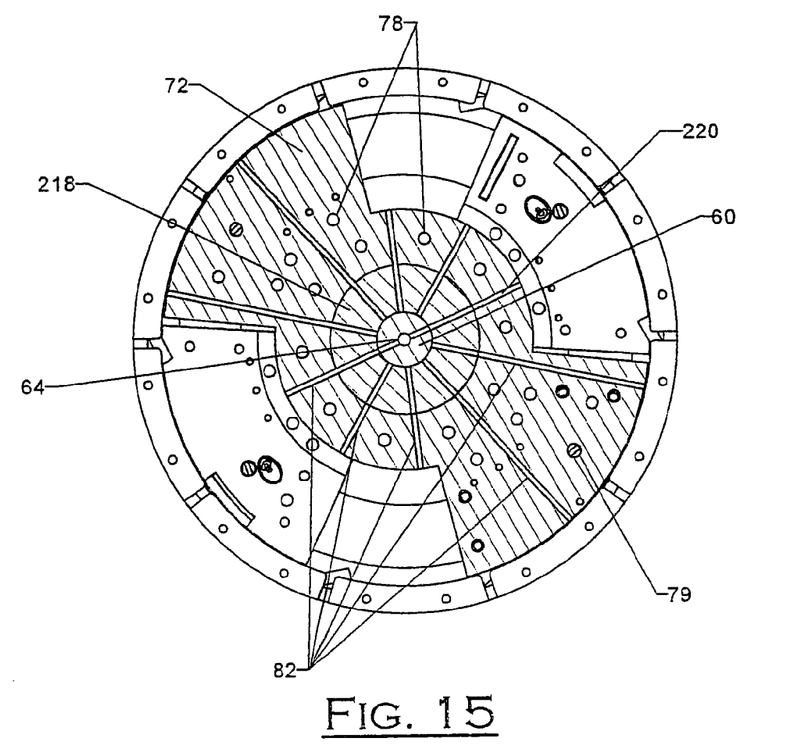
FIG. 15 is a cross sectional view taken along line 15—15 of FIG. 10.
Figure 16:
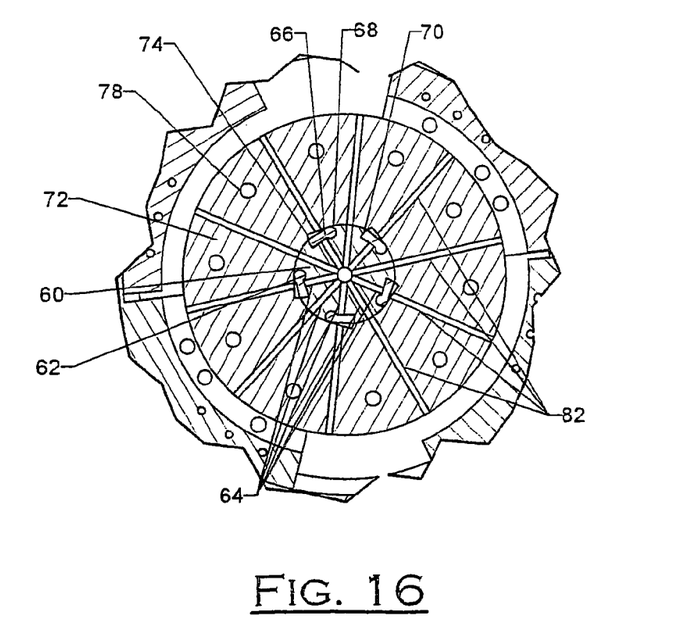
FIG. 16 is a cross sectional view taken along line 16—16 of FIG. 10.
Figure 18A:
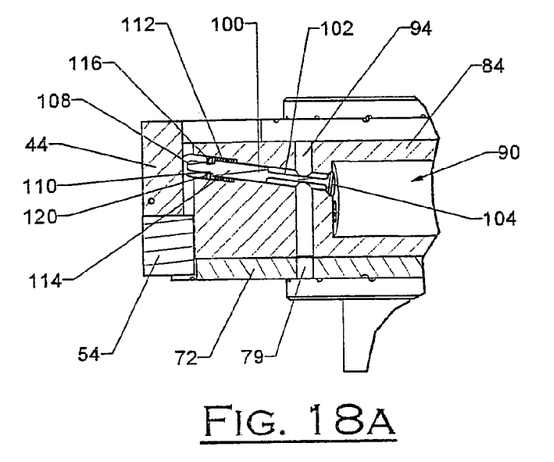
FIG. 18A is a partial illustration, taken along line 18A—18A of FIG. 13, of a valve associated with the engine sub-assembly in a closed position.
Figure 18B:
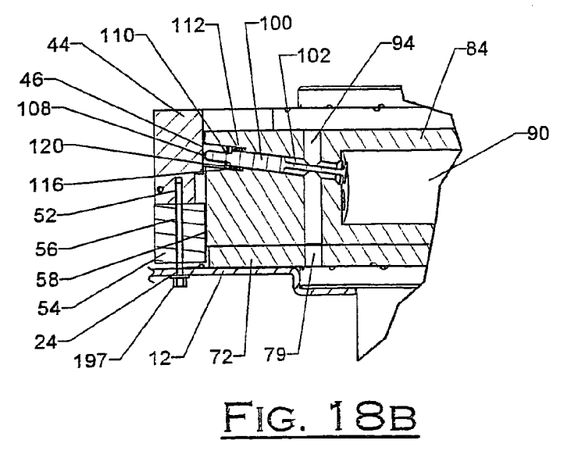
FIG. 18B is a substantially identical illustration of the valve illustrated in FIG. 18A and in a further opened position.

A brake receiver ring is illustrated at 44 (see as best shown in FIGS. 1, 4 and 14) and includes such features as valve actuation cam surface for opening valves 46, brake encasement bearing pockets 48, fuel injection port holes 50 and attachment holes for bolts 52 (see FIGS. 14 and 18A and 18B in particular). The brake receiver ring 44, as will be further described, operates to provide a supporting surface for driving the piston assemblies in the rotary and centrifugal fashion. In particular, each of the pistons are understood to include an actuating and exteriorly positioned piston reservoir, each of the reservoirs being engageable with a brake ring encircling the pistons along selected locations and at specified intervals.

Figure 12:
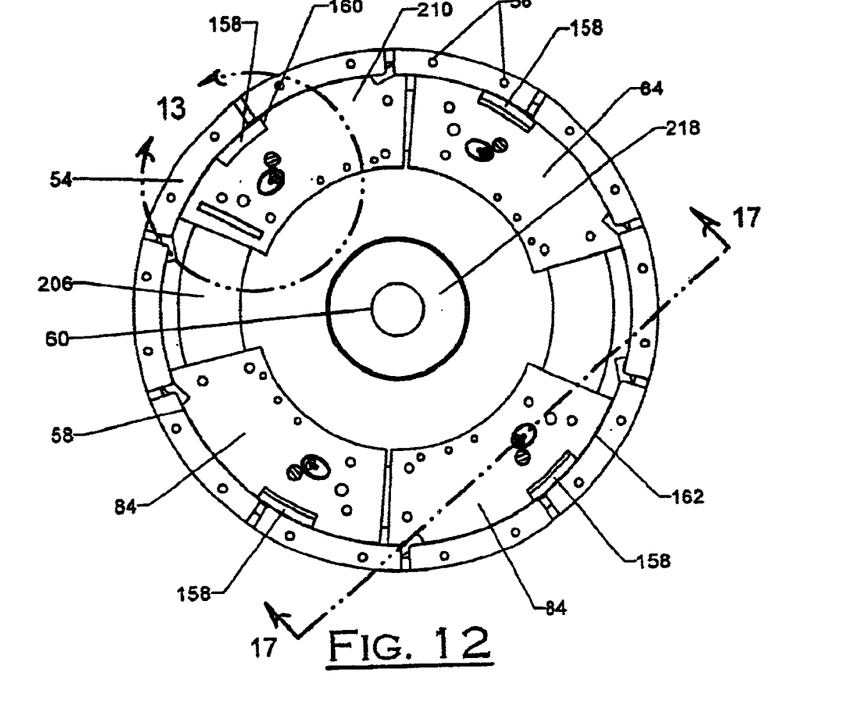
FIG. 12 is an internal view of an engine assembly piston, illustrated along lines 12—12 of FIG. 4, and according to the present invention.
Figure 13:
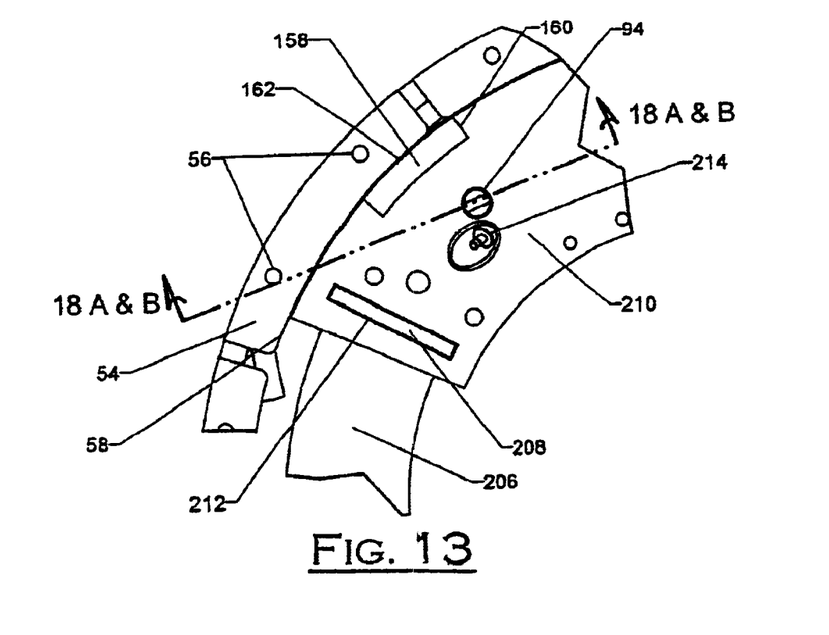
FIG. 13 is an enlarged partial view of selected piston illustrated in FIG. 12 and corresponding to that previously shown in FIG. 5 with removable male feature.

Referring now to FIGS. 1, 12 and 18A, a plurality of electrodes are illustrated at 54, arranged in an interconnected and ring-like fashion and which secure in sandwiching fashion between the cover 36, outer casing 12, and intermediately positioned brake receiver ring 44. The electrodes 54 include attachment holes 56 (see FIG. 16) as well as a surface 58 for electrical current generation with piston iron laminates 158. The purpose of the electrode ring array 54 is to facilitate electromagnetic generation of power and which either assists in cogenerating and driving support of the normal operation of the piston and valve and crank assemblies, provides operating power exclusively of the piston and valves, or is employed to recharge the vehicle battery.

Figure 3:
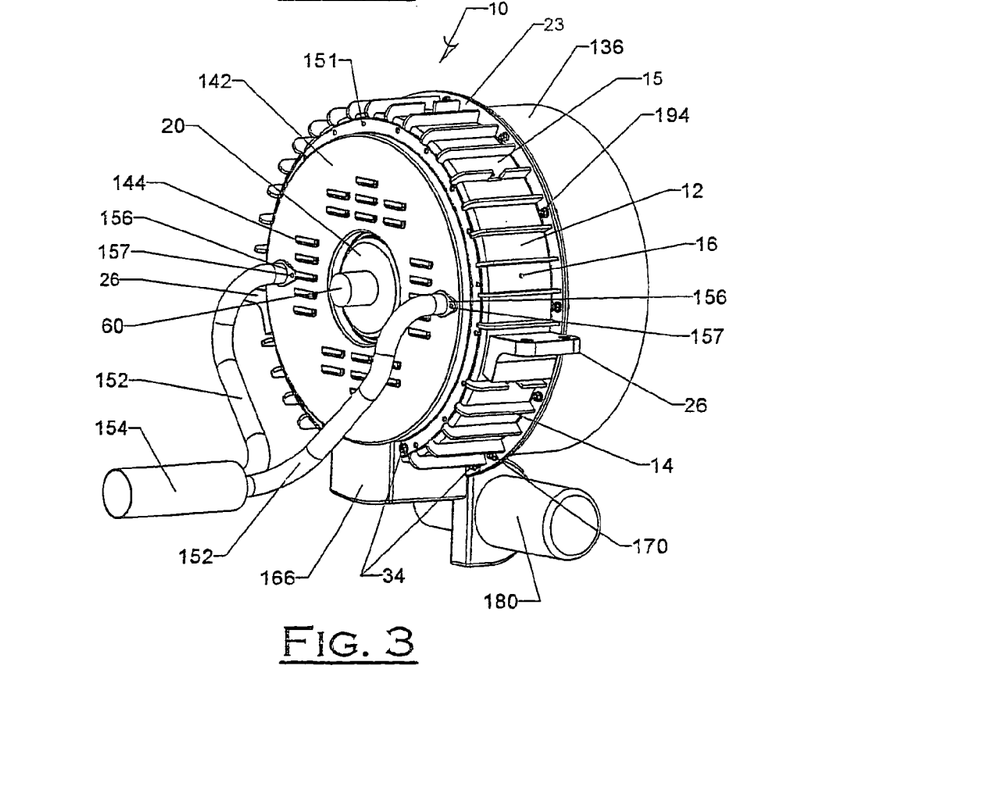
FIG. 3 is a rotated rear perspective view of the assembled engine illustrated in FIG. 2.

A crankshaft 60, see FIGS. 1, 3, 4, et seq., is arranged in rotatably meshing engagement with a plurality of piston ratchet plates 72 (see as further particularly illustrated in FIGS. 15 and 16) and, in cooperation with the piston and valve assemblies associated with the rotary engine, facilitate output of driving power of the rotary engine to the associated vehicle drive train. As best further shown in FIG. 16, the crank 60 includes a plurality of brake encasement bearing pockets 62 (operating in cooperation with a crankshaft brake 66, see FIG. 1) through lock surfaces for engaging with crank brake pockets 68 and lock surfaces for engaging with piston ratchets 70. A plurality of oil injection ports 64 are also located in radial array between the piston ratchet plates 72 and the central crank 60.

Additional features of the piston ratchet plates 72, which again translate rotary driving power from the pistons to the crank in coordinated manner, includes the provision of pockets 74 for engaging with the crankshaft brake 66, piston mounting holes 76 (FIG. 11), air cooling holes 78, and exhaust/intake holes 79. Additional features include crankshaft bearing encasement pockets 80 and oil injection port holes 82 (see as best shown in FIG. 14).

Figure 5:
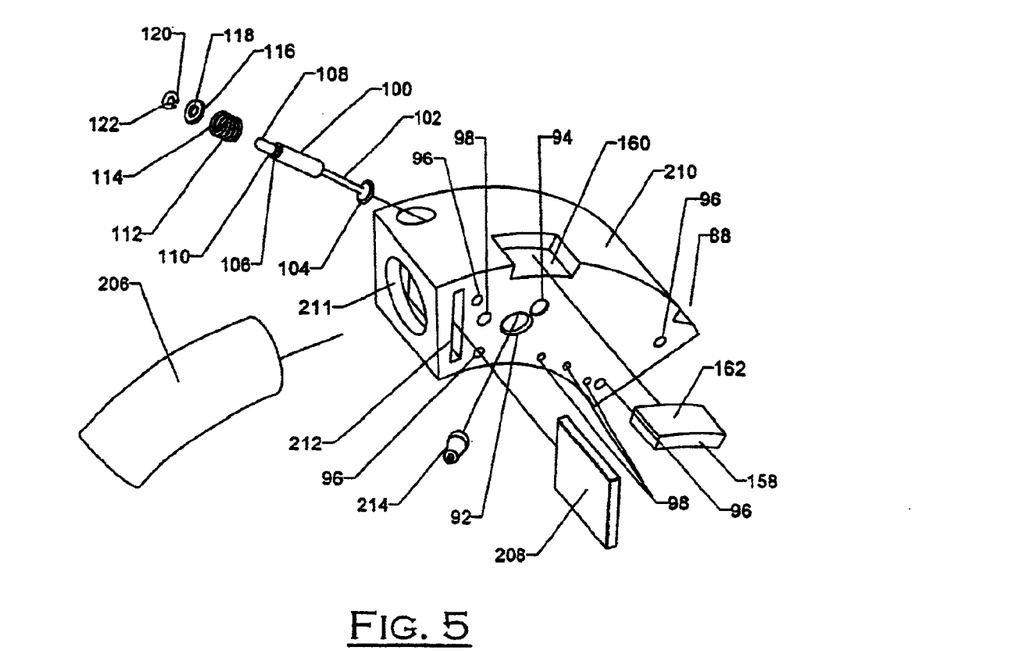
FIG. 5 is a partial exploded view of a first selected piston sub-assembly with removable male feature.
Figure 6:
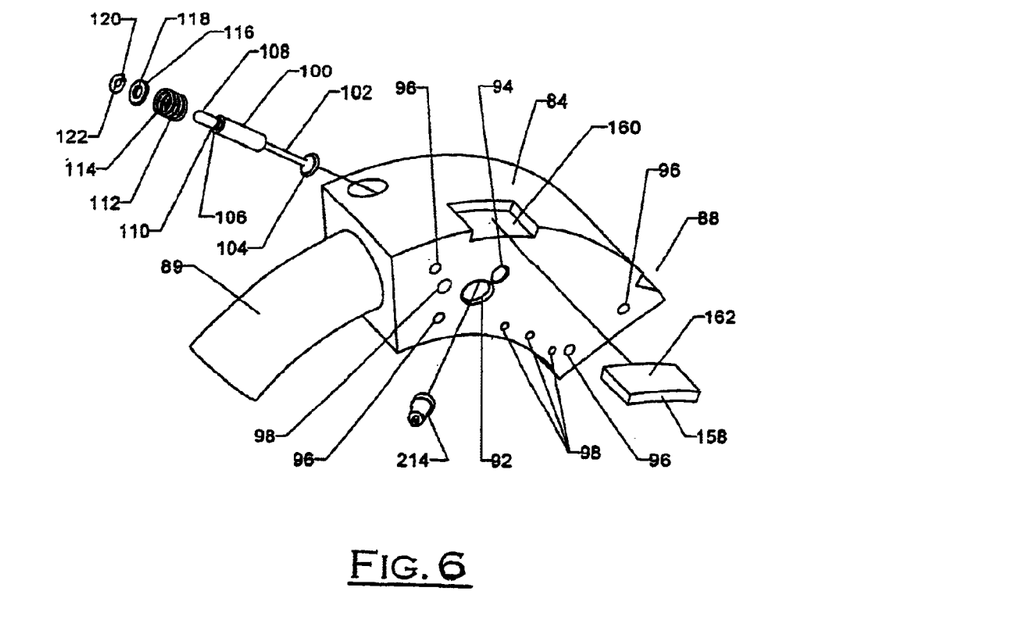
FIG. 6 is a partial exploded view of a selected one of a plurality of second piston sub-assemblies, each exhibiting a fixed male feature.
Figure 7:
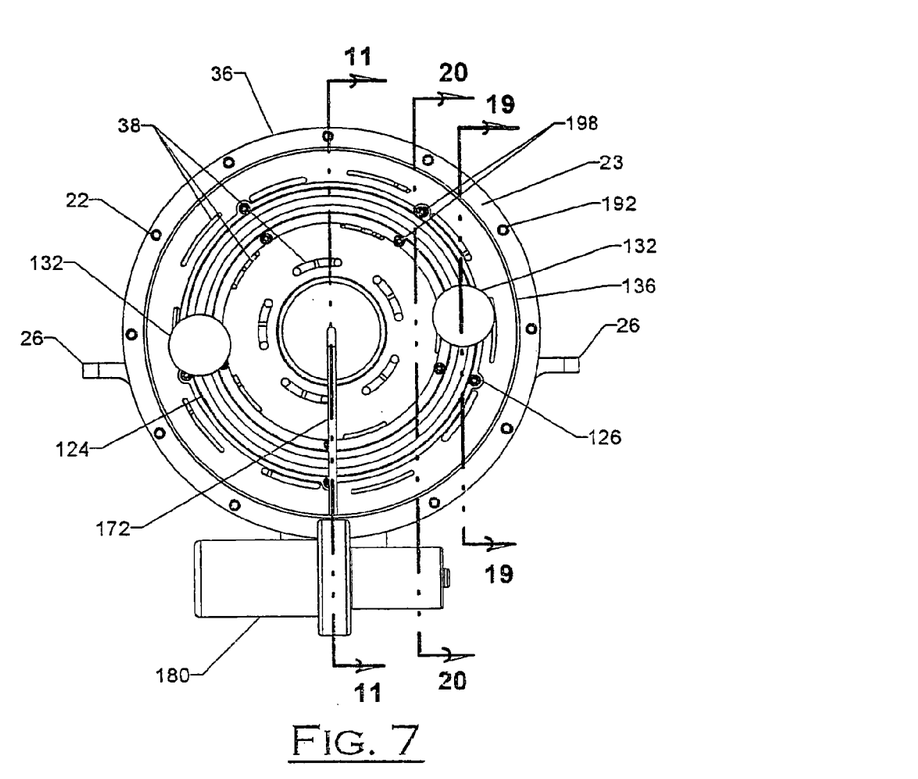
FIG. 7 is a front view of the engine assembly according to the present invention.
Figure 8:
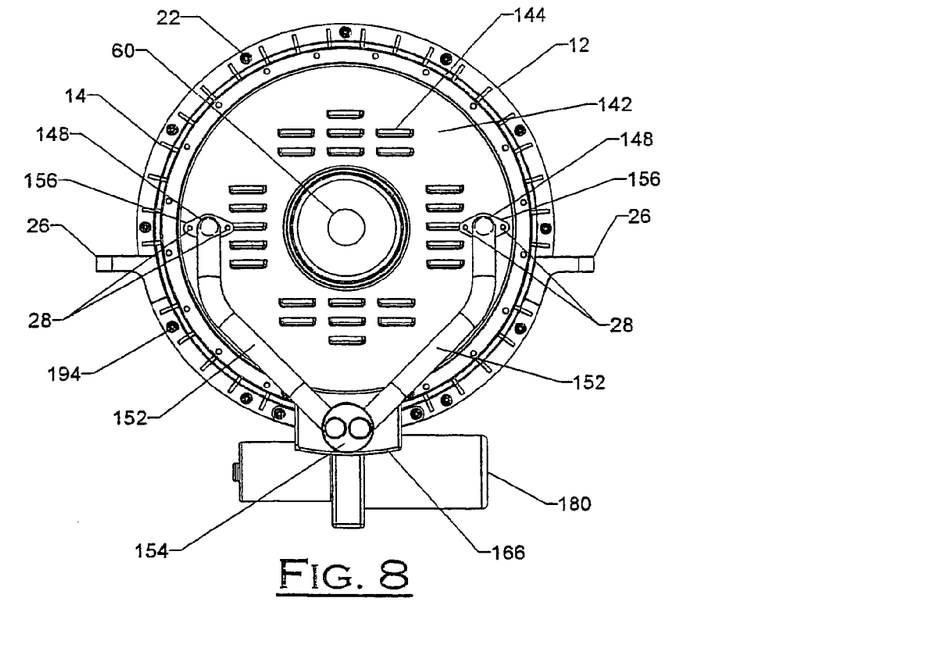
FIG. 8 is a rear view of the engine assembly.
Figure 9:
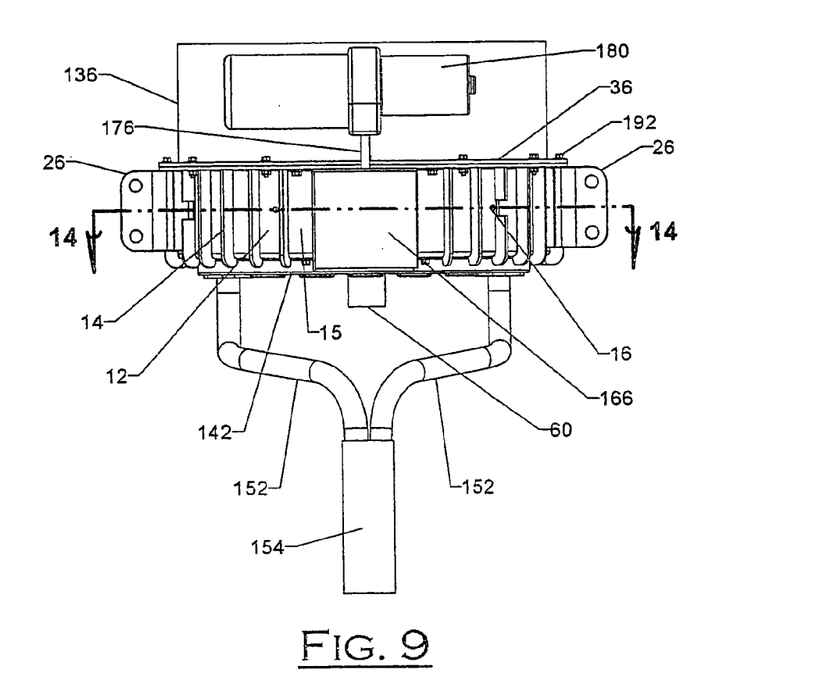
FIG. 9 is a bottom view of the engine assembly.
Figure 10:
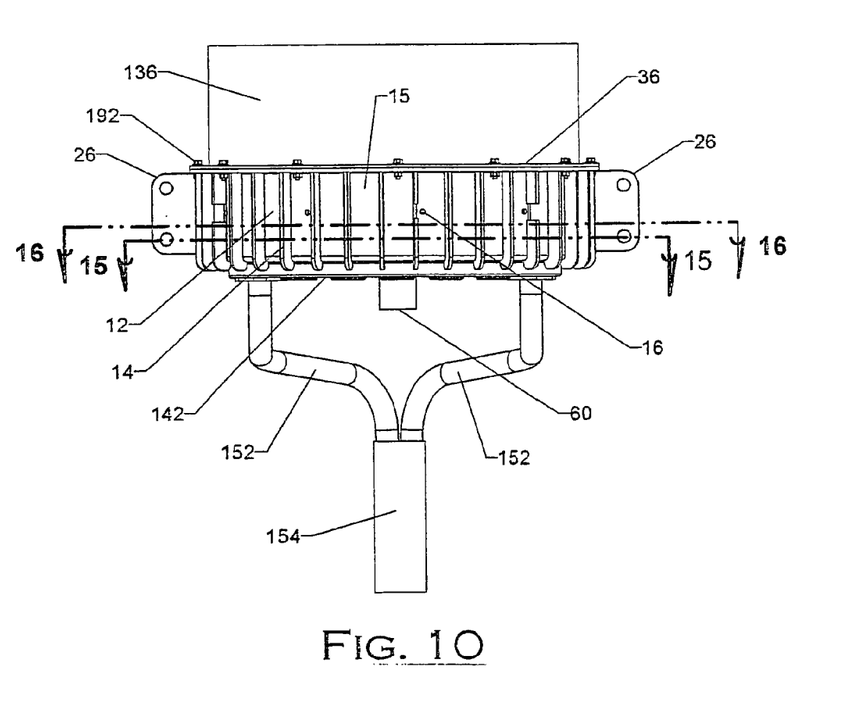
FIG. 10 is a top view of the engine assembly.

Referring now to FIGS. 1, 5 and 6, a plurality of pistons 84 (typically four in the preferred embodiment illustrated) are provided, among these including a single male piston 89 (FIG. 5) and a sub-plurality of three additional pistons 84 (FIG. 6) each having a fixed male feature 89. Each of the pistons includes a fuel injection port hole 86 and brake locking notch 88. The male piston 206 (FIG. 5) further includes a removable block plate 208 which fits within a side disposed slot 212 in an end face of piston 206. Additional components associated with the piston 84 include spark plug attachment holes 92, air intake/exhaust valve chambers 94, ratchet plate mounting holes 96, and air cooling holes 98. As will be described in subsequent detail, these components assist in the coordinated and regulated rotary driving motion of the individual pistons and in order to provide for the intake and exhaust stages of the combustion cycle.

Referring again to FIG. 1, and in particular to FIGS. 5, 6, 18A and 18B, a valve 100 is associated with each of the pistons 84 and 210. Each of the valves 100 includes an air flow neck feature 102 (see in particular FIG. 18A) a tapered head to seal opening 104 leading to the associated piston, a ball end 108 for cam actuation of the valve in opening/closing fashion, and a groove 110 for receiving a retainer clip 120.

As best again shown in the closed (FIG. 18A) and opened (FIG. 18B) positions, the valves work in cooperation with the intake and exhaust ports and in order to facilitate the sequential and offsetting motion of the pistons about the rotary track defined within the outer casing 12 and brake receiver ring 44. A valve spring 112 is also provided and biasingly seats an associated piston rod 114. A spring washer 116 holds the valve spring 112 in places and an inner diameter hole 118 provides clearance for the assembly to fit over the piston rod and to retain the spring in place. Finally a retainer clip 120 is provided, fitting within a hole 122 to clip into a valve rod groove, and thereby retaining the spring washer 116 in place.

Figure 11:
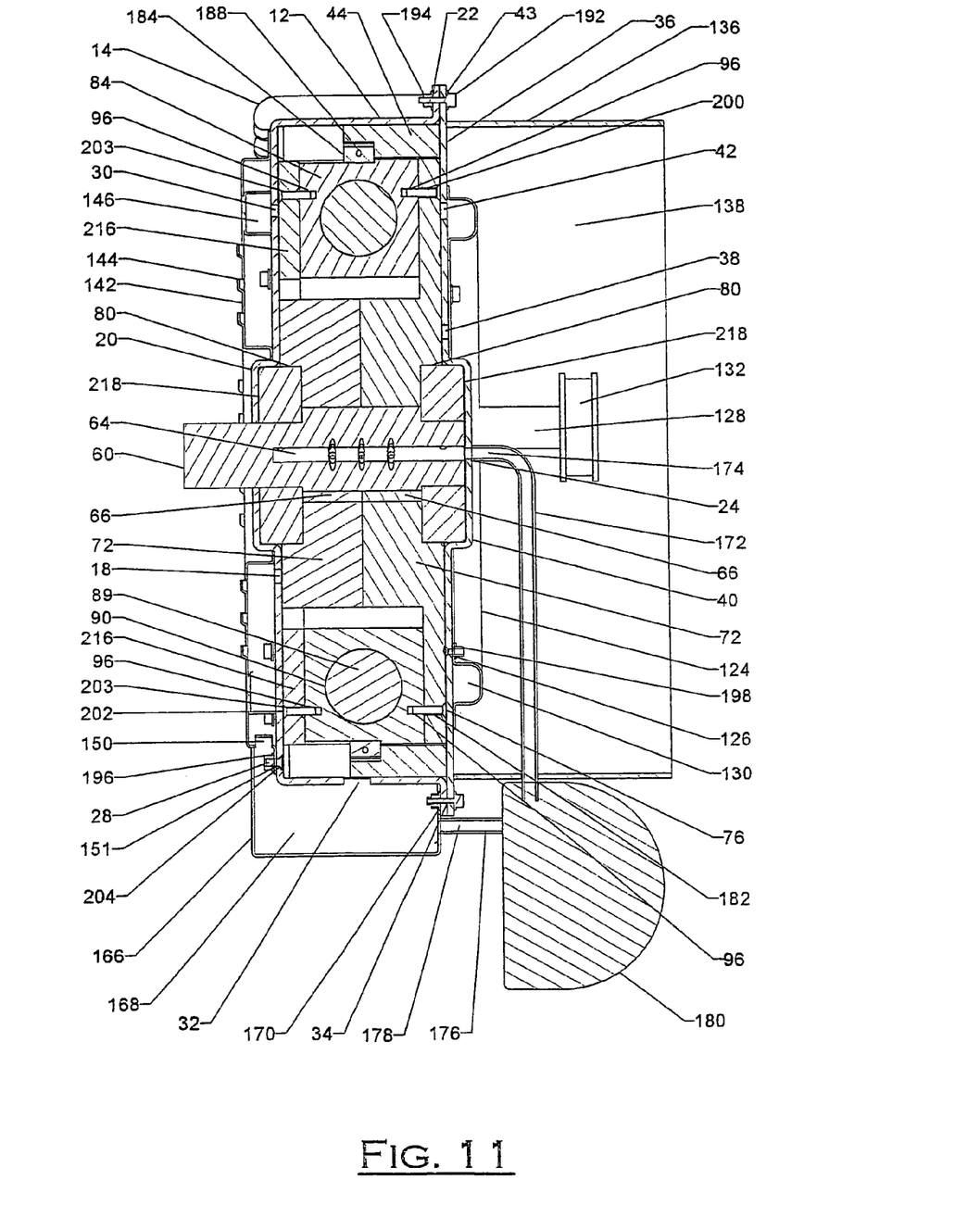
FIG. 11 is a central cutaway view of the engine assembly taken along line 11—11 of FIG. 7.
Figure 19:
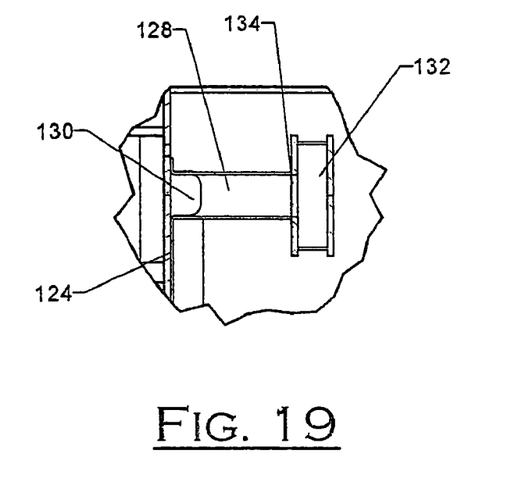
FIG. 19 is a cross sectional view taken along line 19—19 of FIG. 7 and illustrating the features of a selected air filter and air intake nozzle according to the present invention.

As best shown in FIGS. 1 and 11, an intake manifold 124 is provided, the same including attachment holes 126, air intake nozzles 128 and air intake flow chamber 130. As illustrated, the intake manifold 124 provides air flow to the intake holes associated with the piston ratchet plates and pistons. As also shown in FIGS. 1, 11, and 19 air filters 132 are provided and which fit over intake manifold nozzles through attachments 134 (see further FIG. 2). A shroud 136 (FIGS. 1–4 and 11) attaches over the assembled engine components and includes controls 138 for directing air flow from a cooling fan to the engine interior (see at 138) and through cooling slots 38.

An exhaust/cooling air manifold is illustrated at 142, see again FIG. 1 as well as FIG. 3, assembled to the opposite facing surface of the outer casing 12, and which includes a plurality of cooling air flow vents 144, an exhaust flow chamber 146, exhaust holes 148 and an oil collection drain slot 150. As best again shown in FIG. 3, exhaust pipes 152 extend from attachments with the manifold 142 (by virtue of flanges 156) and through which flows the exhaust gases (see at 156).

Magnetic laminates (such as typically) are illustrated at 158 (see FIGS. 5, 6, 12 and 13 in particular) for each associated piston, and which act in cooperation with the electrode array ring 54. An attachment surface at 160 is provided, see also notches formed in the side of each piston, for receiving each associated laminate 158. A surface 162 is established between the electrode array ring 54 and laminates 158 and in order to generate electrical current at the outer positioned electrodes during piston (84 and 210) rotation about the crankshaft 60.

An oil pan 166 (FIGS. 1–4 and 11) is located at a bottom of the engine assembly and collects oil draining from within an engine inner chamber 168, and following the outward radial/centrifugal path the oil flows along after it is introduced through the region of the central crank 60. The oil pan 166 includes attachment holes 170 communicating the outer casing and to mount the same to the assembly (see in particular FIG. 3).

A top oil feed line 172 is provided and which feeds oil from the pump to the crankshaft oil intake port (see further at 174 and as is best shown in FIG. 1 and cutaway of FIG. 11). A bottom oil feed line 176 feeds oil from the oil pan to an oil pump 178, and an oil pump/filter assembly 180 is in communication with the pump, via line 176, for pumping oil through the oil filters and returning the same to the engine assembly.

A plurality of piston brakes 184 (FIGS. 1, 11 and 14) are seated in apertures disposed about the exterior periphery of the individual pistons 84 and 210. As best also illustrated in the cutaway view of FIG. 14, piston lock surfaces 186, fuel injection ports 188 and bearing surfaces 190 for rotation facilitate the individual and alternating motion of the brakes 184 between extended/gripping locations with the brake receiver ring 44, whereby the associated piston adopts a stationary or supporting role, and retracted locations whereby the associated piston is free to be actuated in rotary fashion and to a succeeding angular position in which it seats and re-engages with the brake receiver ring.

A plurality of cover attachment bolts are illustrated at 192 (see FIGS. 2 and 3) and, in cooperation with cover weld nuts 197 facilitate attachment of the shroud 136 to the outer casing 12 and about the exterior flange 23. Intake manifold attachment nuts 198 for securing the intake manifold 124. Piston attachment bolts 200 are further utilized for securing the pistons 84 and 210 and also provided are piston spacer attachment bolts 202.

Additional features associated with the rotary engine assembly include an exhaust manifold attachment stud 204, as shown in FIG. 11, and for securing the exhaust manifold. For ease of assembly, a removable male piston feature is illustrated at 206, see again FIG. 1, and a spacer plate 208 is seated in transverse extending direction (see FIG. 13), within a pocket 212 formed in the piston. A removable male piston feature 206 is also provided in cooperation with an associated female piston 210.

Figure 17:
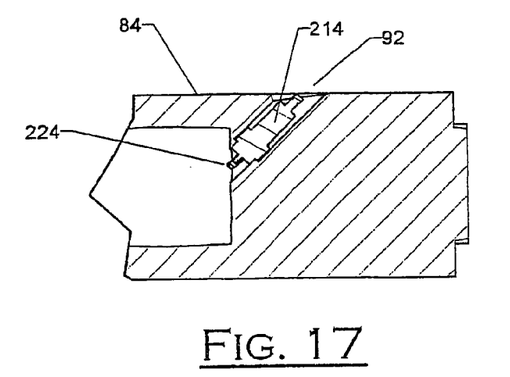
FIG. 17 is an angled cutaway view taken along line 17—17 of FIG. 12 and illustrating the orientation of a selected spark plug in relation to a given piston.
Figure 20:
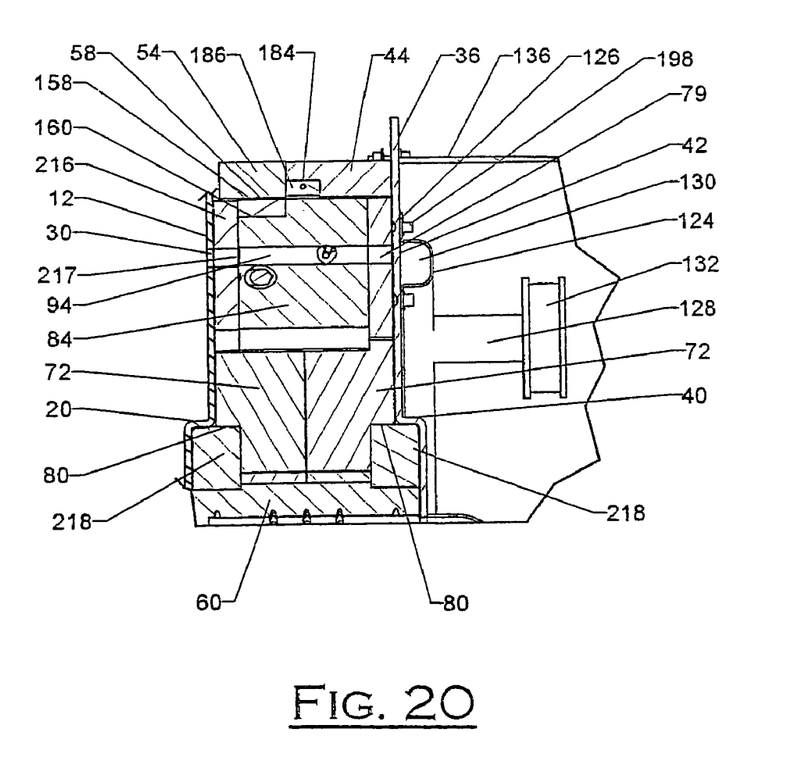
FIG. 20 is a cross sectional view taken along line 20—20 of FIG. 7 and further showing piston intake and exhaust ports associated with the intake manifold.
Figure 21:
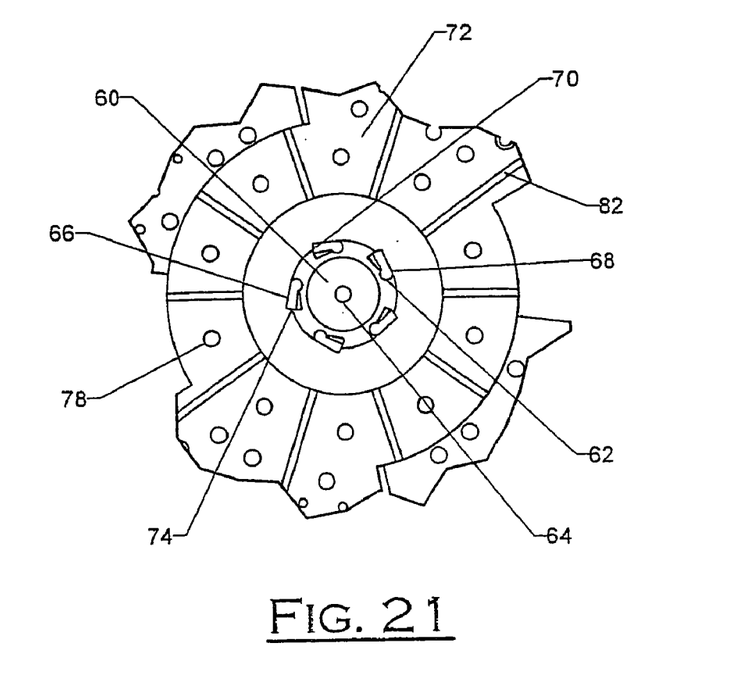
FIG. 21 is a partial end view illustration showing the relationship established between the crankshaft and piston ratchet plates according to the present invention.
Figure 22:
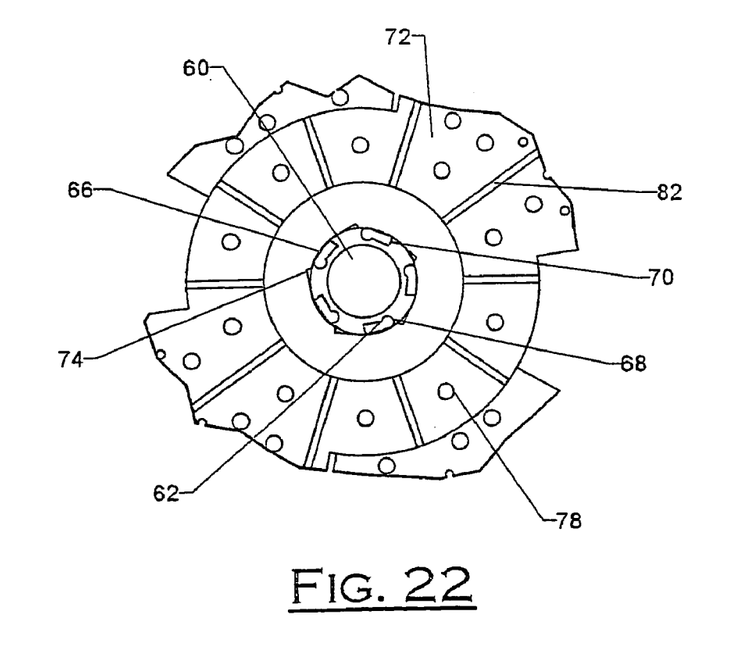
FIG. 22 is a partial end view illustration, substantially identical to that previously shown in FIG. 21, and further illustrating the crankshaft and piston ratchet plates in a further disengaged position.

In order to sequentially drive and actuate each piston, a spark plug 214 is mounted in a communicating and angularly offsetting fashion within each of the pistons 84 and 210 (see also as best shown in the cutaway illustration of FIG. 17). Piston spacer plates are illustrated at 216, as well as exhaust/intake holes 217 (see as also shown in FIG. 20).

A crankshaft bearing 218 is illustrated, see as shown in FIGS. 1, 4, 11, 12, 15 and 20, and oil ports 220 provide oil flow through the bearing 218. Finally a spark ignition tip is illustrated at 224 (see again FIG. 17) for providing sequential firing and actuation of the cylinders in alternating and ratcheting fashion.

In operation, pistons 84, as well as removable male/piston features 206 and 210, are attached to the ratchet plates 72 and which are in turn positioned with the bearings 218 on the crankshaft 60. The bearings 218 are housed in the assembled motor case 12, embossment 20, cover 36, and embossment 40 for the house crankshaft in order to maintain an axial relationship between the ratchet plate and crankshaft. The ratchet plate 72, along with pistons 84 and 210, rotate upon the crankshaft bearings 218. The transfer of motion to rotate the crankshaft 60 is accomplished via the crankshaft brakes 66 engaging with the brake notches 74 of the ratchet plates 72.

As discussed previously, the preferred embodiment disclosed includes four (4) pistons, one of which incorporating the removable male 206 and female 210 features. The order of piston operation commences with a first selected piston firing, a second selected piston engaged in the exhaust cycle, a third selected piston generating the air intake cycle, and the fourth selected and remaining piston intaking fuel and generating compression for ignition.

As first selected piston 84 ignites, it is locked in position via the piston brake 184 being engaged with the brake locking notch 88. The brake 184 is secured to the brake receiver ring 44 by means of the brake encasement bearing pocket 48.

A further function of the piston brake is to provide a channel for the fuel mixture to be injected into the piston combustion chamber, through the brake receiver ring ports 50, brake ports 188 and the piston injector port 86. The fuel mixture is injected at the beginning of the compression operation, at which point the piston injector port 86 is closed off as the male piston feature generates compression with the female piston feature.

In the succeeding step, the spark plug 214 ignites the compressed fuel for combustion and generates the forces necessary to rotate the mating piston in an axial motion about the crankshaft. Rotation of the related components described above is controlled in one direction via the brakes.

Each piston 84 again includes a valve 100 for controlling the flow of intake air and exhaust fumes after ignition. Each valve 100 is actuated via an associated cam surface 46 of the brake receiver ring 44 and as the piston rotates within the engine. The brake receiver ring includes an inner diameter surface that provides a plurality of ten cam surfaces 46, and with these cam surfaces constituting a lesser diameter in relationship. These two surface relationships operate to actuate the valve, through contact with the valve ball end 108, causing the valve to open in its relationship to the opening of the piston combustion chamber. The end of the valve is further tapered to provide a tight fit with the piston intake/exhaust chamber 94 opening.

Each valve 100 is maintained in its closed state via valve spring 112, spring washer 116 and retainer clip 120. A groove 110 provides retention of the retainer clip 120 and the spring is assembled in a compressed state, whereby the force provided thereby maintains the valve in a tight closed position against the intake/exhaust chamber opening of the piston. The brake receiver ring 44 is further secured to the interior of the engine via the mounting bolts 197.

Intake air is supplied through the air filter 132, through the air intake nozzle 128 and air intake flow chambers 130 of the intake manifold 124, as well as through the intake slots 42 of the cover 36. This air is then passed through the ratchet plate holes 79 and piston intake chamber 94. The exhaust gases are passed through the exhaust chambers 94 of the piston, through the ratchet plate holes 79, through the motor case holes 30 and then through the exhaust flow chamber 146 of the exhaust/cooling air manifold 142, and out its holes 148 and through the exhaust pipes 152 and 154. It is understood that each of the chambers include at least a single one way valve which aligns with the piston intake/exhaust chamber of aperture 94.

Each piston includes a spacer plate 216 on the opposing side to that of the ratchet plate 72 and to provide a means to close the spacing between the related side of the piston and the interior surface of either the motor case or cover. The spacer plate 216 is further secured by attachment bolts to the piston through bolt holes in the spacer plate. Holes for cooling and air intake/exhaust to and from the piston are also provided in the spacer as well.

The piston 210 incorporating the removable male feature 206 is backed by the spacer plate 208. When the plate 208 is removed, the male feature 206 is allowed to retract into its attachment pocket 211, providing a means to assemble and disassemble the pistons within the motor assembly in a rotational fashion about the crankshaft. The spacer plate is retained in its pocket via the mounting of the piston spacer plate with its attachment bolts to the piston 210.

Required lubrication of the assembly 10 is provided by oil pumped through a pump and filter assembly 180 via oil lines 172 and 176 extending from the oil pan 166. As the oil is passed through the engine, it drains via gravity action down through the motor case slot 32, through the exhaust/cooling manifold 142 slot 150 and into the collection area 168.

As the oil enters the engine via the crankshaft port 64, it is disbursed through the crankshaft and out its ports in the center area at the brakes. The oil continues to flow, under pump pressure, through the ratchet plate ports 82 and bearing ports 220. Oil continues to be disbursed, via centrifugal forces to the pistons and all moving contact surfaces throughout the interior of the engine.

An additional feature of the present invention, as briefly discussed above, is the operation of the electrode (iron) laminates 158, secured in their respective pockets 160 associated with each piston. As the corresponding piston rotates within the engine, the passage of the laminates 158 to the electrodes 54 generates an electrical current to the spark plug 214 for ignition. The electrodes 54 are again further secured to the interior of the engine via the mounting bolts 197. It is also contemplated that the electrical current generating characteristics of the invention are capable of being utilized both for the cogeneration of power, i.e., concurrent electrical and mechanical inputs in the operation of the rotary engine, as well as separately operating to charge the batteries or to operate the motor assembly itself, in temporary fashion and in the absence of the combustion cycle.

Finally, the engine cooling system further includes the provision of cooled external air supplied by a fan located at the front side of the engine. Air is funneled through the shroud 136, as well as through the cooling slots 38 of the cover 36. Air flows through the engine internal chamber, around its internal moving components and through the ratchet plate cooling holes 78 and piston cooling holes 98. The cooling air exits the engine via the cooling slots 18 in the motor case 12 and through the cooling air vents 144 of the exhaust/cooling air manifold 142.

Having described my invention, other and additional preferred embodiments will become apparent to those skilled in the art to which it pertains and without deviating from the scope of the appended claims.

I claim:

1. A rotary engine assembly, comprising:
   a three dimensional and substantially cylindrical shaped outer casing;
   a plurality of pistons mounted in circumferentially traversable fashion within said casing, at least one selected piston incorporating an extending male feature, at least one further selected piston incorporating a recess within which said male feature seats at selected stages during a rotary combustion cycle associated with said pistons;
   a valve operable with each of said pistons and in order to communicate, to said associated piston, at least one air intake port and exhaust port extending through said casings and during discrete stages of said combustion cycle;
   a plurality of ratchet plates attached to said pistons and traversable therewith, said ratchet plates engaging and actuating in rotary fashion a central crankshaft; and
   an oil feed line associated with a central location of said engine assembly, said oil being disbursed through centrifugal force throughout said pistons and associated contact surfaces and recollecting in gravity fashion within a lowermost disposed oil pan.

2. The engine assembly as described in claim 1, said outer casing further comprising a plurality of heat disbursement fins extending in outward radial fashion therefrom.

3. The engine assembly as described in claim 1, each of said pistons further comprising at least one of a spark plug, igniter, and a glow plug mounted therein in a communicating and angularly offsetting fashion.

4. The engine assembly as described in claim 1, further providing a plurality of radially arrayed and pivotable brakes associated with said crankshaft, said brakes selectively engaging with inwardly facing locations defined along said ratchet plates.

5. The engine assembly as described in claim 1, further comprising an oil pump/filter assembly supplying said oil feed line.

6. The engine assembly as described in claim 1, further comprising a plurality of magnetic components to outwardly facing surfaces of said pistons, an encircling electro-magnetic ring array being positioned around said magnetic components and, upon rotational traversing of said pistons, an electrical current being generated from said magnetic ring array.

7. The engine assembly as described in claim 1, further comprising a rotary bearing interdisposed between said crankshaft and said ratchet plates.

8. The engine assembly as described in claim 1, further comprising at least one pair of mounting brackets extending from exterior facing locations of said outer casing.

9. The engine assembly as described in claim 1, each of said pistons exhibiting a three dimensionally shaped and arcuate extending body.

10. The engine assembly as described in claim 1, further comprising first and second crankshafts attachable in end-to-end fashion to provide inter-connectability.

11. The engine assembly as described in claim 1, further providing a plurality of radially arrayed and pivotal brakes associated with said piston plates, said brakes selectively engaging with inwardly facing locations defined along said crankshaft.

12. The engine assembly as described in claim 1, further comprising an arcuate shaped intake/exhaust manifold selectively associated with said outer casing, at least one air filter being operably connected to said intake manifold.

13. The engine assembly as described in claim 12, an exhaust extending from an exhaust manifold secured to a face of said outer casing opposite said intake manifold.

14. The engine assembly as described in claim 13, further comprising a cooling fan secured to a forward facing side of said outer casing, a plurality of cooling slots being defined through a cover of said casing and facilitating a flow of air through cooling holes in said pistons and said ratchet plates, said cooling air exiting said engine via cooling slots in said casing.

15. The engine assembly as described in claim 1, further comprising a plurality of first, second, third and fourth pistons, each including a male feature extending in a selected direction and seating within an opposing female location in a next succeeding piston.

16. The engine assembly as described in claim 15, each of said pistons further comprising an actuating and exteriorly positioned piston reservoir, each of said reservoirs being engageable with a brake ring encircling said pistons of said brackets being engageable with a brake receiver along selected locations and at specified intervals.

17. The engine assembly as described in claim 15, at least one of said male features being movable within an associated piston.

18. The engine assembly as described in claim 15, each of said pistons further comprising a brake which actuates into a brake reservoir within an encircling ring around said pistons along selected locations and at specified intervals.

19. A rotary engine assembly, comprising:
  a three dimensional and substantially cylindrical shaped outer casing including an air intake cover plate and an exhaust cooling air manifold plate;
  a plurality of pistons mounted in circumferentially traversable fashion within said casing, each of said pistons incorporating an extending male feature at a first end, an opposing and recessed location within a next succeeding piston seating said male feature at selected stages during a rotary combustion cycle associated with said pistons;
  a valve operable with each of said pistons and in order to communicate to said associated piston, at specified stages of said combustion cycle, intake ports communicating with an air intake manifold secured over said cover and exhaust ports extending through said casings to an exhaust/cooling manifold;
  a plurality of ratchet plates operably engaged to said pistons and traversable therewith, said ratchet plates engaging and actuating in rotary fashion a central crankshaft;
  a plurality of magnetic components arrayed relative to outwardly facing surfaces of said pistons, an encircling electro-magnetic ring array being positioned around said magnetic components and, upon rotational traversing of said pistons, an electrical current being generated from said magnetic-ring array; and
  an oil feed line associated with said engine assembly, said oil being disbursed through centrifugal force throughout said pistons and associated contact surfaces and recollecting in gravity fashion within a lowermost disposed oil pan.

\* \* \* \* \*